US008236268B2

(12) United States Patent
Hirano et al.

(10) Patent No.: US 8,236,268 B2
(45) Date of Patent: Aug. 7, 2012

(54) PROCESS FOR PRODUCING SODIUM HYDROGENCARBONATE CRYSTAL PARTICLES HAVING LOW CAKING PROPERTY

(75) Inventors: Hachirou Hirano, Chiba (JP); Takako Hirano, legal representative, Chiba (JP); Shintaro Kikuchi, Ibaraki (JP); Fumiaki Nakashima, Ibaraki (JP); Hisakazu Arima, Ibaraki (JP); Shigeru Sakurai, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 1163 days.

(21) Appl. No.: 11/616,296

(22) Filed: Dec. 27, 2006

(65) Prior Publication Data
US 2007/0178037 A1 Aug. 2, 2007

Related U.S. Application Data

(63) Continuation of application No. PCT/JP2005/012103, filed on Jun. 30, 2005.

(30) Foreign Application Priority Data

Jun. 30, 2004 (JP) .................. 2004-194540

(51) Int. Cl.
*C01D 7/00* (2006.01)
*C01D 15/08* (2006.01)
*C01D 17/00* (2006.01)

(52) U.S. Cl. ............... 423/422; 423/419.1; 423/421; 423/267

(58) Field of Classification Search ............... 423/419.1, 423/421, 422, 267; C01D 7/42
See application file for complete search history.

(56) References Cited

U.S. PATENT DOCUMENTS

| | | | | |
|---|---|---|---|---|
| 2,034,685 A | * | 3/1936 | Langer | 23/304 |
| 2003/0211027 A1 | | 11/2003 | Yokoyama et al. | |
| 2006/0193765 A1 | | 8/2006 | Nakashima et al. | |

FOREIGN PATENT DOCUMENTS

| | | |
|---|---|---|
| EP | 0 719 715 A1 | 7/1996 |
| EP | 1 357 085 A2 | 10/2003 |
| JP | 04-270113 | 9/1992 |
| JP | 05-058622 | 3/1993 |
| JP | 2001-171045 | 6/2001 |
| JP | 2003-104722 | 4/2003 |

OTHER PUBLICATIONS

U.S. Appl. No. 11/619,411, filed Jan. 3, 2007, Hirano, et al.

* cited by examiner

*Primary Examiner* — Jennifer Michener
*Assistant Examiner* — Heng Chan
(74) *Attorney, Agent, or Firm* — Oblon, Spivak, McClelland, Maier & Neustadt, L.L.P.

(57) ABSTRACT

A process for producing sodium hydrogencarbonate crystal particles having a low caking property, which entails subjecting sodium hydrogencarbonate crystal particles having an average particle size of from 50 to 500 μm based on the mass to heat treatment at a temperature of from 70 to 95° C. by a heating gas having a carbon dioxide gas concentration of at most the concentration calculated by the formula: Carbon dioxide gas concentration=$0.071 \times e^{(0.1 \times T)} \times R^{(-0.0005 \times T - 0.9574)}$, where T (° C.) is the temperature of sodium hydrogencarbonate crystals, and R (%) is the relative humidity around the crystals at the temperature of the crystals, provided that the upper limit of the carbon dioxide gas concentration is 100 vol % to form anhydrous sodium carbonate on the surface of the sodium hydrogencarbonate crystal particles with a content of anhydrous sodium carbonate of from 0.03 to 0.4 mass % in the sodium hydrogencarbonate crystals.

5 Claims, 1 Drawing Sheet

— T=70°C in the formula (1)
— - T=80°C in the formula (1)
... T=90°C in the formula (1)
—·- T=95°C in the formula (1)

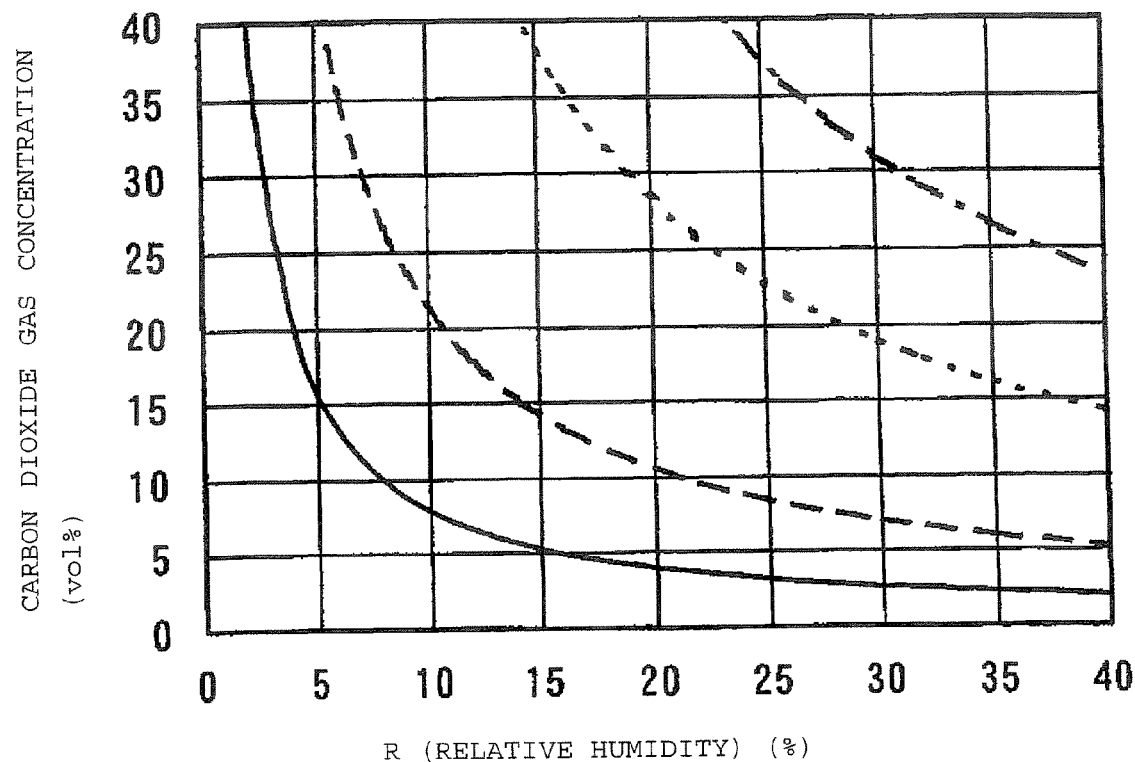
— T=70°C in the formula (1)
-- T=80°C in the formula (1)
... T=90°C in the formula (1)
-·- T=95°C in the formula (1)

PROCESS FOR PRODUCING SODIUM HYDROGENCARBONATE CRYSTAL PARTICLES HAVING LOW CAKING PROPERTY

TECHNICAL FIELD

The present invention relates to a novel process for producing sodium hydrogencarbonate crystal particles having a low caking property which are useful particularly in the field of food products, pharmaceuticals, etc. and which require no necessity to contain an anticaking agent, and a method for packaging the produced sodium hydrogencarbonate crystal particles.

BACKGROUND ART

Sodium hydrogencarbonate ($NaHCO_3$ which is also called baking soda or sodium bicarbonate) is widely used in the field of various food products, as baking powder, an additive for soft drinks, etc., in the pharmaceutical industry as a dialysate, an antacid, etc., and further as a fire-extinguishing agent, as a bath additive, as a detergent, as a blasting medium, as an acidic gas neutralizing agent, etc. In most cases, such sodium hydrogencarbonate is produced and packaged, delivered, transported, stored and used in the form of powdery or granular crystal particles.

However, commercial crystal particles of sodium hydrogencarbonate generally show a caking property and has a high caking property resulting from sodium carbonate formed by drying in the production process, especially in an environment at a high temperature with a high humidity. This tendency is remarkable particularly in the rainy season. If caking occurs, the flowability of the particles will be low, and the handling efficiency will deteriorate remarkably in the respective steps from distribution to use, and various troubles are brought about. Thus, the caking is a serious problem which may impair the commercial value of sodium hydrogencarbonate.

Heretofore, in order to prevent the caking of sodium hydrogencarbonate crystal particles, e.g. Patent Document 1 proposes to incorporate various anticaking agents, such as stearates, carbonates, phosphates, silicates, kaolin, talc or silicon dioxide.

However, such a conventional method for incorporating an anticaking agent, not only requires a cost for the anticaking agent or a step of its incorporation, but also requires selection of the type of the anticaking agent depending upon the particular application. Further, for food products, pharmaceuticals, etc., it is impossible to use it, or its amount of use may be limited.

Further, Patent Document 2 discloses a method for producing sodium hydrogencarbonate crystals having a reduced caking property, by drying sodium hydrogencarbonate at from 20 to 60° C. by heated air. However, since the drying temperature is low, the treatment efficiency of a drying apparatus tends to be low, the drying apparatus tends to be large, or the drying time tends to be long.

Further, Patent Document 3 discloses a method for producing sodium hydrogencarbonate crystals having a reduced caking property, which comprises making sodium sesquicarbonate be present on the surface of sodium hydrogencarbonate crystal particles. However, in order to convert sodium hydrogencarbonate into sodium sesquicarbonate, treatment with a high humidity in a long time is required, and accordingly the equipment tends to be large. Further, in the case of treatment at a temperature of at least 30° C. to shorten the treatment time, the temperature and the humidity at the time of conversion into sodium sesquicarbonate greatly vary depending upon the carbon dioxide gas concentration in the atmosphere, and accordingly the carbon dioxide gas concentration, the humidity and the temperature must be controlled with very high accuracy.

Patent Document 1: JP-A-5-58622
Patent Document 2: Japanese Patent No. 3306873
Patent Document 3: JP-A-2003-104722

DISCLOSURE OF THE INVENTION

Objects to be Accomplished by the Invention

Under these circumstances, it is an object of the present invention to provide a novel process for producing sodium hydrogencarbonate crystal particles having a low caking property, capable of preventing the caking without use of an anticaking agent which will bring about an increase in cost by its addition and cause various problems along with its use, and capable of reducing the caking property easily and efficiently without requiring a long treatment time in their production process.

Further, the present invention provides a packaging method capable of preventing caking of sodium hydrogencarbonate crystal particles having a low caking property thus obtained over a long period of time.

Mean to Accomplish the Objects

The present inventors have conducted extensive studies on prevention of caking of sodium hydrogencarbonate crystal particles and as a result, found that the caking property of sodium hydrogencarbonate crystal particles can be reduced through the following procedure.

Namely, on the surface of sodium hydrogencarbonate crystals, depending upon various conditions such as the temperature, the humidity and the carbon dioxide gas concentration, of a gas of an atmosphere, in the drying step, or in a case where the crystal particles are discharged from the drying step, with which the particles are to be in contact, a very small amount of sodium hydrogencarbonate is decomposed into anhydrous sodium carbonate ($Na_2CO_3$), and further converted into sodium carbonate monohydrate ($Na_2CO_3.H_2O$) or Wegscheider's salt ($Na_2CO_3.3NaHCO_3$) and then converted into sodium sesquicarbonate ($Na_2CO_3 NaHCO_3.2H_2O$). The conversion of anhydrous sodium carbonate into sodium sesquicarbonate via sodium carbonate monohydrate is disclosed in American Chemical Society, monograph series, "MANUFACTURE OF SODA", second edition, Chapter XXIX, Behavior of Soda Ash in Storage, pages 509 to 515 (published by Reinhold Publishing, 1942).

Further, according to the studies by the present inventors, it has been confirmed that caking occurs when, on the surface of sodium hydrogencarbonate crystals, anhydrous sodium carbonate is converted into sodium carbonate monohydrate or Wegscheider's salt, or anhydrous sodium carbonate is converted into sodium sesquicarbonate via sodium carbonate monohydrate or Wegscheider's salt. It has been found that relatively weak caking occurs in the former case of conversion of anhydrous sodium carbonate into sodium carbonate monohydrate or Wegscheider's salt, but stronger caking occurs in the latter case of conversion of anhydrous sodium carbonate into the final product sodium sesquicarbonate. This is considered to result from crosslinking of the particles at points where the crystals are in contact, since not only the crystals themselves change but also their volume and mass increase by the above conversion, as shown in the following Table 1. The changes in the volume and the mass of the crystals are more significant when anhydrous sodium carbonate is converted into sodium sesquicarbonate than when anhydrous sodium carbonate is converted into sodium carbonate monohydrate or Wegscheider's salt. This is empirically understood from the fact that the degree of caking is substantially in proportion thereto.

TABLE 1

| | Anhydrous sodium carbonate | Sodium carbonate monohydrate | Wegscheider's salt | Sodium sesquicarbonate |
|---|---|---|---|---|
| Formula weight | 105.99 | 124.00 | 358.01 | 226.03 |
| Density (g/cm$^3$) | 2.533 | 2.259 | 2.334 | 2.044 |
| Mass (g) per 1 mol of Na | 53.0 | 62.0 | 71.6 | 75.3 |
| Volume (cm$^3$) per 1 mol of Na | 20.9 | 27.4 | 30.7 | 36.9 |

It is understood from the above findings that caking can be prevented by preventing the change on the surface of the sodium hydrogencarbonate crystals and making the composition on the surface of the sodium hydrogencarbonate crystals be stable crystals in the storage atmosphere. However, the environment for storage of sodium hydrogencarbonate varies depending upon the seasonal factor, etc., caking can not be prevented even when the surface of the sodium hydrogencarbonate crystal particles is fixed to have a certain crystal composition of only sodium carbonate monohydrate, only Wegscheider's salt or only sodium sesquicarbonate, as one example is shown below. According to detailed experiments and studies based on thermodynamic calculation by the present inventors, in the air (carbon dioxide concentration 0.04 vol %), the boundary between Wegscheider's salt and sodium sesquicarbonate is as shown in the following Table 2, and stable crystals vary with the temperature and the humidity. The boundary between Wegscheider's salt and sodium sesquicarbonate also depends on the concentration of the carbon dioxide gas, and the boundary shifts toward a high humidity side as the carbon dioxide gas concentration increases. In a case where sodium hydrogencarbonate is hermetically sealed in e.g. a polyethylene bag, the carbon dioxide gas concentration in the bag increases to 0.1 vol % in some cases, and accordingly the boundary is present in a range of a relative humidity of from 35 to 50% depending upon the carbon dioxide concentration. With respect to the state of the sodium hydrogencarbonate crystal particles under weather conditions at a high humidity side and a low humidity side of the boundary, for example, in the rainy season, sodium sesquicarbonate is stable under a high humidity condition, and when the humidity is low, Wegscheider's salt is stable. Further, the relative humidity in the bag in which sodium hydrogencarbonate is packaged increases or decreases depending upon the difference in temperature between day and night. Thus, prevention of caking is hardly achieved only by bringing the surface of crystal particles of sodium hydrogencarbonate to have a predetermined composition of only sodium carbonate monohydrate, only Wegscheider's salt, or only sodium sesquicarbonate.

TABLE 2

| | Temperature (° C.) | | | | |
|---|---|---|---|---|---|
| | 18 | 22 | 26 | 30 | 34 |
| Lowest relative humidity at which sodium sesquicarbonate is formed (%) | 37 | 36 | 35 | 34 | 33 |

However, the present inventors have noted the above described phenomenon that the degree of caking is relatively low when anhydrous sodium carbonate is converted into sodium carbonate monohydrate or Wegscheider's salt, but it is high when anhydrous sodium carbonate is converted into sodium sesquicarbonate, and a fact that sodium hydrogencarbonate crystal particles are usually contained and stored as packaged in an enclosed space such as in a polyethylene packaging bag. Further, they have found that caking of sodium hydrogencarbonate crystals can be prevented within a substantially tolerable range by a new concept of positively introducing an operation of subjecting sodium hydrogencarbonate crystals to heat treatment so as to positively form anhydrous sodium carbonate in an amount within a specific range on the surface of the sodium hydrogencarbonate crystal particles, which has been avoided.

Namely, in a case where the surface of the sodium hydrogencarbonate crystal particles in an amount within a specific range is positively changed into anhydrous sodium carbonate so that a predetermined amount of anhydrous sodium carbonate is present on the surface of the sodium hydrogencarbonate crystals and the crystal particles are hermetically packaged and stored, anhydrous sodium carbonate on the surface absorbs moisture in the enclosed space and is converted into sodium carbonate monohydrate or Wegscheider's salt. And so long as anhydrous sodium carbonate is present, conversion of anhydrous sodium carbonate into sodium carbonate monohydrate or Wegscheider's salt continuously proceeds, whereby the humidity in the packaging space is reduced. That is, anhydrous sodium carbonate functions as a drying agent. Therefore, no humidity required to cause conversion from anhydrous sodium carbonate finally into sodium sesquicarbonate via sodium carbonate monohydrate or Wegscheider's salt, resulting in strong caking, is provided. Resultingly, the surface of the sodium hydrogencarbonate crystals contains anhydrous sodium carbonate and in addition, sodium carbonate monohydrate or Wegscheider's salt only, and no formation of sodium sesquicarbonate in such an amount to cause strong caking will be achieved, and caking of the sodium hydrogencarbonate crystal particles is prevented within a substantially tolerable range.

Here, the amount of anhydrous sodium carbonate on the surface of the sodium hydrogencarbonate crystal particles is preferably from 0.03 to 0.4 mass %. If the amount is smaller than this range, the effect as the drying agent will not last long, and if it is too large, caking may occur on the contrary.

Namely, the present invention provides the following.
(1) A process for producing sodium hydrogencarbonate crystal particles having a low caking property, which comprise subjecting sodium hydrogencarbonate crystal particles having an average particle size of from 50 to 500 μm based on the mass to heat treatment at a temperature of from 70 to 95° C. by a heating gas having a carbon dioxide gas concentration of at most the concentration calculated by the following formula (1):

$$\text{Carbon dioxide gas concentration} = 0.071 \times e^{(0.1 \times T)} \times R^{(-0.0005 \times T - 0.9574)} \quad (1)$$

(wherein T (° C.) is the temperature of sodium hydrogencarbonate crystals, and R (%) is the relative humidity around the crystals at the temperature of the crystals, provided that the upper limit of the carbon dioxide gas concentration is 100 vol %) with reference to the graph of FIG. 1 wherein the horizontal axis (X-axis) represents the relative humidity (%) and the vertical axis (Y-axis) represents the carbon dioxide gas concentration (vol %), to form anhydrous sodium carbonate on the surface of the sodium hydrogencarbonate crystal particles with a content of anhydrous sodium carbonate of from 0.03 to 0.4 mass % in the sodium hydrogencarbonate crystals.

(2) The production process according (1), wherein the content of sodium carbonate monohydrate, Wegscheider's salt and sodium sesquicarbonate in the sodium hydrogencarbonate crystals is at most 0.3 mass % as calculated as anhydrous sodium carbonate.

(3) The process for producing sodium hydrogencarbonate crystal particles according to (1) or (2), wherein a slurry containing sodium hydrogencarbonate is obtained by crystallization, wet sodium hydrogencarbonate crystal particles are separated from the slurry, and the wet sodium hydrogencarbonate crystal particles are subjected to heat treatment.

(4) The process for producing sodium hydrogencarbonate crystal particles according to (1) or (2), wherein a slurry containing sodium hydrogencarbonate is obtained by crystallization, wet sodium hydrogencarbonate crystal particles are separated from the slurry, and the wet sodium hydrogencarbonate crystal particles are dried and then subjected to heat treatment.

(5) The production process according to any one of (1) to (4), wherein the heat treatment is carried out by means of a rotary drier.

(6) Sodium hydrogencarbonate crystal particles having a low caking property, which has a content of anhydrous sodium carbonate of from 0.05 to 0.20 mass % in the sodium hydrogencarbonate crystal particles, and a content of sodium carbonate monohydrate, Wegscheider's salt and sodium sesquicarbonate of at most 0.3 mass % as calculated as anhydrous sodium carbonate.

(7) A method of packaging sodium hydrogencarbonate crystal particles, which comprises packaging the sodium hydrogencarbonate crystal particles obtained by the production process as defined in any one of (1) to (5) or as defined in (6), in a material having a water vapor transmission rate of at most 5 g/(m$^2$·24 h) at 40° C. with a relative humidity difference of 90% as stipulated in JIS K 7129.

(8) The packaging method according to (7), wherein the material for packaging is a laminated sheet using a resin sheet obtained by vapor deposition treatment with alumina or silica.

(9) The packaging method according to (8), wherein the innermost layer of the laminated sheet as the material for packaging, to be in contact with the sodium hydrogencarbonate crystal particles, is made of an additive-free polyethylene.

Effects of the Invention

According to the present invention, by a novel idea that the surface of sodium hydrogencarbonate crystal particles is positively changed into anhydrous sodium carbonate so that anhydrous sodium carbonate in an amount within a specific range is present on the surface of the sodium hydrogencarbonate crystal particles and this anhydrous sodium carbonate functions as a drying agent, caking on the surface of sodium hydrogencarbonate can be reduced within a tolerable range over a long time by treatment in a short time without use of an anticaking agent. As a result, sodium hydrogencarbonate crystal particles having a low caking property, which require no selection of the type of the anticaking agent, the use of which is not limited, which do not require a long treatment time, and which are suitably applicable to industrial fields such as food products, pharmaceuticals, bath additives, etc., can be obtained.

Further, according to the present invention, it is possible to prevent caking over a long period of time by packaging the obtained sodium hydrogencarbonate crystal particles having a low caking property in a packaging material having a specific vapor transmission or below.

BRIEF DESCRIPTION OF THE DRAWING

FIG. 1 is a graph illustrating conditions under which sodium hydrogencarbonate crystals are subjected to heat treatment to form anhydrous sodium carbonate on their surface, and the horizontal axis (X-axis) represents the relative humidity (%) and the vertical axis (Y-axis) represents the carbon dioxide gas concentration (vol %). In FIG. 1, the solid line represents a case where the temperature (T) is 70° C., the broken line represents a case where the temperature (T) is 80° C., the dotted line represents a case where the temperature (T) is 90° C., and the alternate long and short dash line represents a case where the temperature (T) is 95° C.

BEST MODE FOR CARRYING OUT THE INVENTION

In the present invention, sodium hydrogencarbonate crystal particles are subjected to heat treatment so that the surface of the sodium hydrogencarbonate crystal particles is decomposed and anhydrous sodium carbonate in an amount within a specific range is formed on the surface of the crystal particles. This is an idea exactly opposite to and is very different from a conventional production process with careful attention not to decompose sodium hydrogencarbonate, such as a process which comprises a drying step requiring heating, wherein for the drying step, a heated carbon dioxide gas is used so that sodium hydrogencarbonate will not be decomposed as far as possible ("Soda handbook", page 105 (published by Japan Soda Industry Association in 1975)). Further, even when the air is used for drying, the idea of the present invention is very different from a process of Japanese Patent No. 3306873 (20 to 60° C.) or a process of the above-described "MANUFACTURE OF SODA", page 282 (40 to 50° C.), in which it is attempted not to raise the temperature of sodium hydrogencarbonate as far as possible.

The present invention is effective for sodium hydrogencarbonate crystal particles to be subjected to heat treatment having any average particle size, but the is present invention is effective for crystal particles having an average particles size of from 50 to 500 µm, preferably from 70 to 300 µm. If the average particle size exceeds 500 µm, the influence of the mass of the crystals tends to be significant, and caking is likely to disintegrate by the gravity. Further, if it is smaller than 50 µm, particles tend to agglomerate by the influence of the force between particles such as Van der Waals force, and the number of sites at which the particles are in contact with one another per unit volume of the particles tends to increase, whereby the crystal particles inherently tend to be caked, and the effect of the present invention tends to decrease. Here, the average particle size is an average particle size based on the mass, and is defined as the 50% particle size in the cumulative particle size distribution based on the mass obtained by a sieving method. Specifically, measurement is carried out by means of a Ro-Tap shaker and a sieving method as stipulated in JIS Z 8801-1 (hereinafter referred to simply as a sieving method).

The sodium hydrogencarbonate crystal particles to be subjected to heat treatment in the present invention may be sodium hydrogencarbonate crystal particles in a wet state separated from a slurry containing sodium hydrogencarbonate in the existing process for producing sodium hydrogencarbonate crystal particles or may be sodium hydrogencarbonate crystal particles which have already been produced. For example, they may be (i) sodium hydrogencarbonate crystal particles in a wet state separated from a slurry containing sodium hydrogencarbonate obtained in a crystallization step of reacting an aqueous sodium carbonate solution or an aqueous sodium carbonate solution containing sodium hydroxide or sodium hydrogencarbonate with a carbon dioxide gas to obtain sodium hydrogencarbonate, may be (ii) sodium hydrogencarbonate crystal particles obtained by drying the sodium hydrogencarbonate crystals in a wet state, may be (iii) sodium hydrogencarbonate crystal particles obtained by sieving the dried sodium hydrogencarbonate crystal particles, or may be (iv) sodium hydrogencarbonate crystal particles obtained by pulverizing and classifying the sieved sodium hydrogencarbonate crystal particles. In the case of the above (i), a drying step and a step of forming anhydrous sodium carbonate do not have to be carried out separately when heat treatment is conducted so as to function also as drying the sodium hydrogencarbonate crystal particles, such being efficient from an economical viewpoint also. In the case where an additional equipment is provided with the existing equipment to carry out the present invention, a proper method may be selected from the above methods depending upon circumstances such that the scale of the equipment should be small.

In the present invention, as a means of subjecting the sodium hydrogencarbonate crystal particles to heat treatment, such as the temperature, the humidity and the carbon dioxide gas concentration, it is preferred to bring the sodium hydrogencarbonate crystal particles into contact with a heating gas while they are made to flow, and a rotary dryer or a fluidized bed may be suitable used. Particularly, preferred is a rotary dryer capable of providing a long retention time, capable of stably setting operation conditions in detail and capable of providing a flow close to the piston flow and thereby capable of uniform treatment. As the gas for heat treatment, the air or a nitrogen gas may be used so long as it satisfies the requirement to have a carbon dioxide gas concentration as calculated by the formula (1) or below, or a dry gas may be used in a recycling manner.

In a case where the sodium hydrogencarbonate crystals are subjected to heat treatment to form anhydrous sodium carbonate on their surface, Wegscheider's salt, sodium carbonate monohydrate, sodium sesquicarbonate or sodium carbonate decahydrate may be formed as a by-product depending upon heat treatment conditions. However, in the present invention, the formation can be efficiently carried out preferably under the following conditions. Namely, in the present invention, sodium hydrogencarbonate crystal particles are subjected to heat treatment at a temperature of from 70 to 95° C. by a heating gas having a carbon dioxide gas concentration of at most the concentration calculated by the following formula (1):

$$\text{Carbon dioxide gas concentration} = 0.071 \times e^{(0.1 \times T)} \times R^{(-0.0005 \times T - 0.9574)} \tag{1}$$

on the basis of the graph of FIG. 1 wherein the horizontal axis (X-axis) represents the relative humidity (%) and the vertical axis (Y-axis) represents the carbon dioxide gas concentration (vol %).

T is the temperature (° C.) of the sodium hydrogencarbonate crystal particles subjected to heat treatment, and the relative humidity (R(%)) and the carbon dioxide gas concentration (vol %) are values as calculated as the temperature of the sodium hydrogencarbonate crystal particles subjected to heat treatment. The temperature of the sodium hydrogencarbonate crystal particles is measured, for example, by applying a thermometer such as a thermocouple to sodium hydrogencarbonate crystal particles discharged from a drying apparatus or a baking apparatus. In FIG. 1, curves of the formula (1) in cases where T is 70° C., 80° C., 90° C. and 95° C. are shown as examples. In FIG. 1, the solid line represents a case where the temperature (T) is 70° C., the broken line represents a case where the temperature (T) is 80° C., the dotted line represents a case where the temperature (T) is 90° C., and the alternate long and short dash line represents a case where the temperature (T) is 95° C. Specifically, with reference to a curve in a case where T is each of the temperatures, a heating gas having a carbon dioxide gas concentration of at most the carbon dioxide gas concentration (vol %) corresponding to R (relative humidity, %) is used.

In the present invention, in the case of forming anhydrous sodium carbonate, the gas used for the heat treatment suitably has a relative humidity of preferably at most 30%, more preferably at most 20%, particularly preferably at most 15%. The above relative humidity is preferably as low as possible, since formation of Wegscheider's salt ($Na_2CO_3 \cdot 3NaHCO_3$) can be avoided even when the carbon dioxide gas concentration is high, and formation of sodium carbonate monohydrate can be securely avoided.

Further, the temperature of the sodium hydrogencarbonate crystal particles in the heat treatment is preferably from 70 to 100° C., particularly preferably from 70 to 95° C. The treatment time tends to be longer when the temperature is lower, and accordingly if the temperature is less than 70° C., the retention time for the treatment tends to be long, and the equipment tends to be large. On the other hand, if the temperature is so high as higher than 100° C., decomposition of sodium hydrogencarbonate tends to be accelerated, whereby it will be difficult to control the treatment operation, and anhydrous sodium carbonate at a predetermined concentration will hardly be achieved.

As specific preferred conditions to carry out the above heat treatment, the following conditions may be mentioned.

a. In a case where the relative humidity of the gas to be used for the heat treatment is within a range of at most 30% and higher than 20%, the carbon dioxide gas concentration of the gas to be used for the heat treatment is at most 3 vol % in a case where the temperature of the crystal particles of sodium hydrogencarbonate is 70° C., at most 4 vol % in the case of higher than 70° C. to 75° C., at most 7 vol % in the case of higher than 75° C. to 80° C., at most 11 vol % in the case of higher than 80° C. to 85° C., at most 19 vol % in the case of higher than 85° C. to 90° C., and at most 31 vol % in the case of higher than 90° C. to 95° C. More preferably, the carbon dioxide gas concentration is at most 2 vol % in a case where the temperature is 70° C., at most 3 vol % in the case of higher than 70° C. to 75° C., at most 5 vol % in the case of higher than 75° C. to 80° C., at most 9 vol % in the case of higher than 80° C. to 85° C., at most 15 vol % in the case of higher than 85° C. to 90° C., and at most 25 vol % in the case of higher than 90° C. to 95° C. Furthermore preferably, the carbon dioxide gas concentration is at most 1 vol % in a case where the temperature is 70° C., at most 2 vol % in the case of higher than 70° C. to 75° C., at most 4 vol % in the case of higher than 75° C. to 80° C., at most 6 vol % in the case of higher than 80° C. to 85° C., at most 11 vol % in the case of higher than 85° C. to 90° C., and at most 17 vol % in the case of higher than 90° C. to 95° C.

b. In a case where the relative humidity of the gas to be used for the heat treatment is within a range of at most 20% and higher than 10%, the carbon dioxide gas concentration of the gas to be used for the heat treatment is at most 4 vol % in a case where the temperature of the crystal particles of sodium hydrogencarbonate is 70° C., at most 6 vol % in the case of higher than 70° C. to 75° C., at most 11 vol % in the case of higher than 75° C. to 80° C., at most 17 vol % in the case of higher than 80° C. to 85° C., at most 29 vol % in the case of higher than 85° C. to 90° C., and at most 46 vol % in the case of higher than 90° C. to 95° C. More preferably, the carbon dioxide gas concentration is at most 3 vol % in a case where the temperature is 70° C., at most 5 vol % in the case of higher than 70° C. to 75° C., at most 9 vol % in the case of higher than 75° C. to 80° C., at most 15 vol % in the case of higher than 80° C. to 85° C., at most 25 vol % in the case of higher than 85° C. to 90° C., and at most 40 vol % in the case of higher than 90° C. to 95° C. Furthermore preferably, the carbon dioxide gas concentration is at most 2 vol % in a case where the temperature is 70° C., at most 3 vol % in the case of higher than 70° C. to 75° C., at most 6 vol % in the case of higher than 75° C. to 80° C., at most 10 vol % in the case of higher than 80° C. to 85° C., at most 16 vol % in the case of higher than 85° C. to 90° C., and at most 26 vol % in the case of higher than 90° C. to 95° C.

c. In a case where the relative humidity of the gas to be used for the heat treatment is within a range of at most 10% and higher than 5%, the carbon dioxide gas concentration of the gas to be used for the heat treatment is at most 8 vol % in a case where the temperature of the crystal particles of sodium hydrogencarbonate is 70° C., at most 13 vol % in the case of higher than 70° C. to 75° C., at most 21 vol % in the case of higher than 75° C. to 8° C., at most 34 vol % in the case of higher than 80° C. to 85° C., at most 57 vol % in the case of higher than 85° C. to 90° C., and at most 100 vol % in the case of higher than 90° C. to 95° C. More preferably, the carbon dioxide gas concentration is at most 6 vol % in a case where the temperature is 70° C., at most 11 vol % in the case of higher than 70° C. to 75° C., at most 19 vol % in the case of higher than 75° C. to 80° C., at most 30 vol % in the case of higher than 80° C. to 85° C., at most 52 vol % in the case of higher than 85° C. to 90° C., and at most 90 vol % in the case of higher than 90° C. to 95° C. Furthermore preferably, the carbon dioxide gas concentration is at most 5 vol % in a case where the temperature is 70° C., at most 7 vol % in the case of higher than 70° C. to 75° C., at most 12 vol % in the case of higher than 75° C. to 80° C., at most 19 vol % in the case of higher than 80° C. to 85° C., at most 32 vol % in the case of higher than 85° C. to 90° C., and at most 56 vol % in the case of higher than 90° C. to 95° C.

d. In a case where the relative humidity of the gas to be used for the heat treatment is within a range of at most 5%, the carbon dioxide gas concentration of the gas to be used for the heat treatment is at most 16 vol % in a case where the temperature of the crystal particles of sodium hydrogencarbonate is 70° C., at most 25 vol % in the case of higher than 70° C. to 75° C., at most 45 vol % in the case of higher than 75° C. to 80° C., at most 73 vol % in the case of higher than 80° C. to 85° C., at most 100 vol % in the case of higher than 85° C. to 90° C., and at most 100 vol % in the case of higher than 90° C. to 95° C. More preferably, the carbon dioxide gas concentration is at most 14 vol % in a case where the temperature is 70° C., at most 23 vol % in the case of higher than 70° C. to 75° C., at most 40 vol % in the case of higher than 75° C. to 80° C., at most 68 vol % in the case of higher than 80° C. to 85° C., at most 90 vol % in the case of higher than 85° C. to 90° C., and at most 90 vol % in the case of higher than 90° C. to 95° C. Furthermore preferably, the carbon dioxide gas concentration is at most 9 vol % in a case where the temperature is 70° C., at most 14 vol % in the case of higher than 70° C. to 75° C., at most 25 vol % in the case of higher than 75° C. to 80° C., at most 41 vol % in the case of higher than 80° C. to 85° C., at most 57 vol % in the case of higher than 85° C. to 90° C., and at most 60 vol % in the case of higher than 90° C. to 95° C.

In such a manner, sodium hydrogencarbonate on the surface of the sodium hydrogencarbonate crystal particles is decomposed into anhydrous sodium carbonate, and on the surface of the sodium hydrogencarbonate crystal particles, anhydrous sodium carbonate is formed. Here, the surface of the sodium hydrogencarbonate crystal particles means the surface of the crystal particles, and a portion preferably within about 2 μm, particularly preferably within about 1 μm below the surface. The content of anhydrous sodium carbonate present on the surface of the sodium hydrogencarbonate crystal particles is preferably from 0.03 to 0.4 mass % in the sodium hydrogencarbonate crystal particles. If the content of anhydrous sodium carbonate is less than 0.03 mass %, the amount of anhydrous sodium carbonate which functions as a drying agent tends to be too small, whereby the persistence of the effect of preventing caking tends to decrease, and meanwhile, if the content exceeds 0.4 mass %, the influence of weak caking which will occur when anhydrous sodium carbonate is converted into sodium carbonate monohydrate or Wegscheider's salt tends to be significant as described hereinafter, and the effect of the present invention will not be achieved. Particularly, the content of anhydrous sodium carbonate is preferably from 0.05 to 0.2 mass %, whereby the effect as a drying agent will be properly achieved and in addition, the influence of weak caking tends to be small. Here, the mass of the sodium hydrogencarbonate crystal particles as the basis is the mass of the crystal particles themselves and is not calculated as anhydrous sodium carbonate.

In a case where sodium hydrogencarbonate on the surface of the sodium hydrogencarbonate crystal particles is decomposed into anhydrous sodium carbonate, as described above, part of sodium hydrogencarbonate may be converted into Wegscheider's salt, sodium carbonate monohydrate or sodium sesquicarbonate, but in the present invention, the content of the above salts other than anhydrous sodium carbonate is preferably at a level of a predetermined content or below. Namely, in a case where sodium carbonate monohydrate, Wegscheider's salt and sodium sesquicarbonate are contained, their total content is preferably at most 0.3 mass %, particularly preferably at most 0.2 mass % as calculated as anhydrous sodium carbonate in the sodium hydrogencarbonate crystal particles. If the above content exceeds 0.3 mass %, the effect of reducing the caking property of the present invention tends to be small and further, the purity of the sodium hydrogencarbonate crystal particles as a product (hereinafter sometimes referred to simply as a product) tends to be low, such being unfavorable.

The sodium hydrogencarbonate crystal particles of the present invention thus obtained, having anhydrous sodium carbonate on their surface, are usually packaged, delivered, transported, and stored by a distributor or a user. In the present invention, in such a case, as a material for packaging the sodium hydrogencarbonate crystal particles, it is suitable to use a packaging material having a water vapor transmission rate of preferably at most 5 g/(m$^2$·24 h), particularly preferably at most 1 g/(m$^2$·24 h), at 40° C. with a relative humidity difference of 90% as stipulated in JIS K 7129. By use of such a packaging material having a water vapor transmission rate within the above range, the persistence of the caking preventing performance of the sodium hydrogencarbonate crystal particles having anhydrous sodium carbonate on their surface will remarkably increase.

As the packaging material having the above water vapor transmission rate, for example, it is preferred to use a sheet or a film of a resin having alumina or silica vapor-deposited on its surface as a moisture-proof layer. As an example of the structure of such a packaging material, a laminated sheet may be preferably used, which is obtained in such a manner that a polyethylene terephthalate film (hereinafter referred to as a PET film) having a thickness of preferably from 5 to 30 μm, having alumina or silica vapor-deposited thereon, is used as a moisture-proof layer for the outermost layer so that the vapor deposition layer faces inside, and as the case requires, a biaxially oriented nylon film (hereinafter referred to as an ON film) having a thickness of preferably from 5 to 30 μm for improving penetration resistance is used for the interlayer, and for the innermost layer to be in contact with the sodium hydrogencarbonate crystal particles, a linear low density polyethylene film (hereinafter referred to as an LLDPE film) having a thickness of preferably from 30 to 150 μm is dry-laminated.

For the moisture-proof layer in the above laminated sheet, an aluminum thin membrane or an aluminum-vapor deposited film may also be used, but they are not transparent, and they may be a barrier in a metal-detecting step at the time of delivery. Further, for the moisture-proof layer, a vinylidene chloride-coated film may also be used, but since it contains chlorine, hydrogen chloride gas will be generated when a packaging bag is burned at the time of its disposal, such being unfavorable. In this regard, it is preferred to use the above PET film having alumina or silica vapor-deposited as a moisture-proof layer, which is transparent, which will pass through a metal detector, and which generates no hydrogen chloride at the time of burning. As a method of vapor-depositing alumina or silica, PVD (physical vapor deposition) method in addition to CVD (chemical vapor deposition) method may be used. As a substrate on which they are vapor-deposited, an ON film may also be used in addition to the PET film.

Further, since the LLDPE film for the innermost layer in the laminated sheet will be in direct contact with the sodium hydrogencarbonate crystal particles as a product, and it is preferred to use a completely additive-free LLDPE which contains no antioxidant or the like which may cause coloring of the product, etc. It is possible to use a low density polyethylene instead of LLDPE, but LLDPE is more preferred, which is excellent in heat-sealing strength.

EXAMPLES

Now, the present invention will be described in detail with reference to Examples, but it should be understood that the present invention is by no means restricted to such specific Examples.

Example 1

Sodium hydrogencarbonate crystal particles (hereinafter sometimes referred to simply as products) having various surface compositions were produced, and a test for evaluating the caking property of them was carried out. In Table 3, No. 1, No. 6 and No. 7 correspond to Comparative Examples, and Nos. 2 to 5 and No. 8 correspond to Examples of the present invention.

20 m$^3$ of an aqueous sodium hydroxide solution having a concentration of 20 mass % was put in a tank (50 m$^3$) provided with a stirrer, and the temperature was raised to 80° C. In such a state, a 100 vol % carbon dioxide gas was blown for 5 hours in a flow rate of 10 m$^3$ per minute in a standard state for reaction crystallization. In the crystallization step, first, sodium hydroxide is reacted with carbon dioxide to form sodium carbonate. So far, no crystals are precipitated. Then, carbon dioxide and sodium carbonate are reacted to form sodium hydrogencarbonate. Here, as the solubility of sodium hydrogencarbonate is low, crystals of sodium hydrogencarbonate are precipitated. Then, by decreasing the temperature to 40° C. while the carbon dioxide gas is continuously blown, crystal particles of sodium hydrogencarbonate were further precipitated. The obtained slurry was subjected to a centrifugal separator to separate the mother liquor, thereby to obtain wet sodium hydrogencarbonate crystal particles.

The wet crystals of sodium hydrogencarbonate were brought into contact with a drying gas consisting of a carbon dioxide gas-containing air in a parallel flow manner under conditions as shown in the following Table 3 using a rotary dryer (manufactured by MASUNO SEISAKUSHO LTD.) so that the sodium hydrogencarbonate crystal particles were dried and part of the sodium hydrogencarbonate crystal particles were baked to form anhydrous sodium carbonate. In Table 3, the temperature of the sodium hydrogencarbonate crystal particles discharged from the rotary dryer is represented as a drying temperature, and the relative humidity and the carbon dioxide concentration of the drying gas were values as calculated as the temperature of the sodium hydrogencarbonate crystal particles.

Immediately after the drying operation, the crystal particles of the sodium hydrogencarbonate were cooled to 30° C. by a cylindrical cooling device provided with a paddle mixer and an indirect cooling jacket. For cooling, a dry air having a dew point of −40° C. was heated to 20° C. and injected into the interior of the cooling device, and a gas accompanying the crystal particles was purged. The carbon dioxide concentration of the dry air used was 0.04 vol %. Then, the obtained sodium hydrogencarbonate crystal particles were subjected to sieving by using a circular shaking sieve provided with an ultrasonic oscillator and provided with a mesh with an opening of 0.25 mm, and particles which passed through a sieve were obtained as a product. This product was employed for the following evaluation regarding the caking. The product which is particles which passed through the sieve has an average particle size of 0.1 mm.

Now, a test method for evaluating the caking property of a product is specifically described below.

1 kg of the above-described product of the sodium hydrogencarbonate crystal particles having an average particle size of 0.1 mm obtained as particles which passed through a sieve by using the circular shaking sieve provided with an ultrasonic oscillator was weighed, and put in a bag made of completely additive-free LLDPE film having a thickness of 120 μm and hermetically sealed by heat sealing, which was left at rest for one month in an atmosphere at 25° C. at a relative humidity of 85%. After still standing, the bag was carefully opened so that the product would not disintegrate, and the product was delicately poured on a test sieve (hereinafter referred to simply as "sieve") having an inner diameter of 200 mm, having a wire netting with an opening of 3 mm set thereto, as stipulated in JIS Z 8801-1. The mass of the product and the sieve was weighed to measure the mass of the product on the sieve to determine the mass ratio to the entire product. The ratio was defined as the "amount of particles weakly caked". Here, the sodium hydrogencarbonate crystal particles which were caked as a whole at the time of opening are considered to have a ratio of 100%.

Then, the sieve on which the product was put was tapped with a hand for three seconds, and the mass of the product and the sieve was weighed to measure the mass of the product on the sieve, to determine the mass ratio to the product at the time of packaging. This ratio was defined as the "amount of particles moderately caked". Further, the sieve on which the product was put was tapped with a hand for 10 seconds, and the mass of the product and the sieve was weighed to measure the mass of the product put on the sieve, to determine the mass ratio to the product at the time of packaging. This ratio was defined as the "amount of particles strongly caked". The above test for evaluating the caking property will be referred to simply as a "caking property evaluation test".

Measurement of the average particle size of the product before the caking property evaluation test depends on the sieving method, and the opening of the sieve used was 355 μm, 250 μm, 180 μm, 150 μm, 106 μm, 75 μm or 45 μm.

Further, for measurement of anhydrous sodium carbonate, sodium carbonate monohydrate, Wegscheider's salt and sodium sesquicarbonate, the total amount of anhydrous sodium carbonate, sodium carbonate monohydrate and sodium sesquicarbonate in the product was quantitatively determinate by anhydrous methanol extraction method as described hereinafter, and the content of sodium carbonate monohydrate or Wegscheider's salt and the content of sodium sesquicarbonate in the product was determined by TGA method as described hereinafter. From the measurement results by these methods, the respective amounts of anhydrous sodium carbonate, sodium carbonate monohydrate and sodium sesquicarbonate in the sodium hydrogencarbonate crystal particles were determined.

The anhydrous methanol extraction method will be described below.

In the present invention, the "anhydrous methanol extraction method" means a method wherein the total amount of anhydrous sodium carbonate, sodium carbonate monohydrate and sodium sesquicarbonate in the product is analyzed by extracting the respective components from sodium hydrogencarbonate with anhydrous methanol, followed by neutralization titration. Specifically, 5 g of the product is weighed, which is put in 100 mL of anhydrous methanol, followed by shaking for 30 minutes. Then, titration is carried out with 0.1 N hydrochloric acid with phenolphthalein as an indicator to quantatively determine the total amount of anhydrous sodium carbonate, sodium carbonate monohydrate and sodium sesquicarbonate in the product. Here, the 0.1 N hydrochloric acid is prepared by diluting a 35 mass % hydrochloric acid aqueous solution with anhydrous methanol so as to reduce inclusion of moisture as far as possible. Or, a methanol solution of hydrogen chloride may be used. Here, Wegscheider's salt is substantially insoluble in anhydrous methanol and is thereby not measured by the anhydrous methanol extraction method.

Now, the TGA method will be explained below.

In the present invention, the "TGA method" is a method of measuring the contents of sodium carbonate monohydrate, Wegscheider's salt and sodium sesquicarbonate in the sodium hydrogencarbonate crystal particles, and is a method of measuring the mass reduction of the respective components by thermolysis at specific two levels of temperatures by a thermogravimetric analyzer and analyzing the content of a sodium carbonate monohydrate or Wegscheider's salt component and the content of a sodium sesquicarbonate component from the difference in the weight reduction profile between the two levels of temperatures.

A certain amount of the present product as a sample to be measured is put in a sample cell, and the product is heated at a constant temperature in a drying gas such as a nitrogen gas, which will not react with sodium hydrogencarbonate, anhydrous sodium carbonate, sodium carbonate monohydrate, Wegscheider's salt nor sodium sesquicarbonate, and the mass reduction when sodium carbonate monohydrate, Wegscheider's salt and sodium sesquicarbonate are decomposed into anhydrous sodium carbonate is precisely measured.

Specifically, a predetermined amount of the product is weighed in a sample cell, and measurement is carried out at a predetermined temperature by an isothermal method using a nitrogen gas containing substantially no moisture by means of a thermogravimetric analyzer. Here, the measurement can be carried out utilizing the facts newly found by the present inventors that sodium hydrogencarbonate is more thermally stable and is less likely to decompose than sodium carbonate monohydrate, Wegscheider's salt and sodium sesquicarbonate and that sodium sesquicarbonate is more thermally stable than sodium carbonate monohydrate and Wegscheider's salt. Namely, employing two levels of predetermined measurement temperatures, and from the difference, the content of sodium carbonate monohydrate or Wegscheider's salt and the content of sodium sesquicarbonate can be accurately determined. For the lower temperature between the two levels of the temperatures, such a temperature is selected that decomposition of sodium carbonate monohydrate or Wegscheider's salt is substantially completed in a certain time and decomposition of sodium sesquicarbonate does not substantially start. Further, for the higher temperature, such a temperature is selected that decomposition of sodium carbonate monohydrate, Wegscheider's salt and sodium sesquicarbonate is substantially completed in a certain time. The temperature and the time vary in accordance with the amount of the sample for measurement, the structure of the measuring apparatus, the structure of the sample container, etc.

In the present Example, thermo-gravimetric/differential thermal analyzer TG/DTA6200 manufactured by SII Nanotechnology Inc. was used. In this measurement, the lower temperature was 53° C., the higher temperature was 63° C., and the weight reduction after a lapse of 50 minutes was measured at each temperature. The mass of the sample used for the measurement was 60 mg. Further, to correct the weight reduction by decomposition of sodium hydrogencarbonate itself in a certain time at each of the two levels of temperatures, measurement was separately carried out with respect to sodium hydrogencarbonate containing substantially no sodium carbonate monohydrate, Wegscheider's salt and sodium sesquicarbonate, and the obtained weight reduction was subtracted from each measured value as a base line. The weight reduction at 53° C. corresponds to the content of sodium carbonate monohydrate or Wegscheider's salt, and the value obtained by subtracting the weight reduction at 53° C. from the weight reduction at 63° C. corresponds to the content of sodium sesquicarbonate. Sodium carbonate monohydrate and Wegscheider's salt were distinguished by judging which of the region of sodium carbonate monohydrate or the region of Wegscheider's salt was achieved in a phase equilibrium diagram based on conditions of the temperature, the relative humidity and the carbon dioxide gas concentration under which the humidification treatment was carried out. In a case of not depending upon the phase equilibrium diagram, crystals of anhydrous sodium carbonate are stored in a long period of time under the atmosphere, and the change of the crystal is examined by structure analysis of the crystals by X-ray diffraction.

The value obtained by subtracting the contents of sodium carbonate monohydrate and sodium sesquicarbonate determined by the TGA method from the content corresponding to the total amount of anhydrous sodium carbonate, sodium carbonate monohydrate and sodium sesquicarbonate determined by the anhydrous methanol extraction method, is the content of anhydrous sodium carbonate.

The results of the test for the caking property of products containing anhydrous sodium carbonate and containing no sodium carbonate monohydrate, Wegscheider's salt nor sodium sesquicarbonate, are shown in the following Table 3. In the TGA method, there was no mass reduction corresponding to sodium carbonate monohydrate or Wegscheider's salt nor mass reduction corresponding to sodium sesquicarbonate, and thus the contents of sodium carbonate monohydrate, Wegscheider's salt and sodium sesquicarbonate were 0 mass %. The same results are obtained with respect to Table 4. Here, each content is calculated as anhydrous sodium carbonate. As evident from Table 3, the degree of caking decreased by a specific content of anhydrous sodium carbonate, and particularly reduction of the amount of particles moderately caked and the amount of particles strongly caked is remarkable, which indicates the effect of the present invention. When the content of anhydrous sodium carbonate is within the specific range defined by the present invention, the caking property is considered to be lowered.

The present inventors estimate the mechanism of how the amount of particles moderately caked and the amount of particles strongly caked have minimum values within the range of the present invention, as follows. That is, in the case where the content of anhydrous sodium carbonate is low, the smaller the amount of anhydrous sodium carbonate, the more the degeneration from anhydrous sodium carbonate into sodium sesquicarbonate proceeded, and high degree of caking occurred. Further, in a case where the content of anhydrous sodium carbonate is high, the area of contact at contact portions among particles increased, whereby initial caking resulting from degeneration from anhydrous sodium carbonate into sodium carbonate monohydrate or Wegscheider's salt proceeded.

TABLE 3

| | No. | | | | | | |
|---|---|---|---|---|---|---|---|
| | 1 | 2 | 3 | 4 | 5 | 6 | 7 |
| Temperature (° C.) | 75 | 75 | 75 | 80 | 84 | 90 | 98 |
| Gas relative humidity (%) | 18 | 18 | 18 | 16 | 13 | 7 | 8 |
| Carbon dioxide concentration in gas (vol %) | 70 | 4 | 3 | 5 | 6 | 10 | 10 |
| Average particle size (μm) | 111 | 103 | 105 | 98 | 101 | 97 | 108 |
| Content of anhydrous sodium carbonate (mass %) | 0.01 | 0.03 | 0.05 | 0.16 | 0.27 | 0.42 | 0.63 |
| Content of sodium carbonate monohydrate and Wegscheider's salt (mass %) | 0.0 | 0.0 | 0.0 | 0.0 | 0.0 | 0.0 | 0.0 |
| Content of sodium sesquicarbonate (mass %) | 0.0 | 0.0 | 0.0 | 0.0 | 0.0 | 0.0 | 0.0 |
| Amount of particles weakly caked (mass %) | 83 | 75 | 70 | 82 | 87 | 96 | 100 |
| Amount of particles moderately caked (mass %) | 59 | 48 | 38 | 32 | 51 | 90 | 100 |
| Amount of particles strongly caked (mass %) | 18 | 13 | 10 | 1 | 11 | 69 | 99 |

Example 2

The packaging bag made of an LLDPE film of 120 μm used in Example 1 had a water vapor transmission rate of 6.0 g/(m²·24 h) at 40° C. with a relative humidity difference of 90% as stipulated in JIS K 7129. Instead, a packaging bag having alumina vapor-deposited thereon was used and the caking property evaluation test was carried out. This packaging bag is made of a sheet having a structure obtained in such a manner that a 12 μm PET film having an alumina transparent vapor deposition applied by the PVD method is used for moisture-proofing for the outermost layer so that the vapor deposition layer faces inside, a 15 μm ON film is used for the interlayer, and for the innermost layer, a 70 μm completely additive-free LLDPE film is used, and they are laminated by dry lamination.

The vapor transmission of the packaging bag was 0.2 g/(m²·24 h) at 40° C. with a relative humidity difference of 90° C. as stipulated in JIS K 7129. As the sample for caking property evaluation test, No. 5 in Example 1 was used. The results are shown in Table 4. The results with respect to the moisture-proof bag correspond to No. 8. Caking could be prevented at a higher level. Further, no coloring of the product was observed on each of the samples in Examples 1 and 2. Further, a metal detector could be used without any problem.

TABLE 4

| | No. | |
|---|---|---|
| | 5 | 8 |
| Average particle size (μm) | 101 | 101 |
| Content of anhydrous sodium carbonate (mass %) | 0.27 | 0.27 |

TABLE 4-continued

| | No. | |
|---|---|---|
| | 5 | 8 |
| Content of sodium carbonate monohydrate and Wegscheider's salt (mass %) | 0.0 | 0.0 |
| Content of sodium sesquicarbonate (mass %) | 0.0 | 0.0 |
| Amount of particles weakly caked (mass %) | 87 | 12 |
| Amount of particles moderately caked (mass %) | 51 | 0 |
| Amount of particles strongly caked (mass %) | 11 | 0 |

INDUSTRIAL APPLICABILITY

According to the present invention, various drawbacks resulting from caking of sodium hydrogencarbonate used can be effectively avoided even in an industrial scale. Further, formation of sodium hydrogencarbonate having a low caking property can be achieved by a means which can be carried out easily in a short time. Otherwise, it can be achieved without additional equipment for baking, by conducting baking also as a drying step.

The entire disclosure of Japanese Patent Application No. 2004-194540 filed on Jun. 30, 2004 including specification, claims, drawings and summary is incorporated herein by reference in its entirety.

What is claimed is:

1. A process for producing sodium hydrogencarbonate crystal particles having a low caking property, which comprises subjecting sodium hydrogencarbonate crystal particles having an average particle size of from 50 to 500 μm based on the mass to heat treatment at a temperature of from 70 to 95° C. by a heating gas having a carbon dioxide gas concentration of at most the concentration calculated by the following formula (1):

$$\text{Carbon dioxide gas concentration} = 0.071 \times e^{(0.1 \times T)} \times R^{(-0.0005 \times T - 0.9574)} \quad (1)$$

(wherein T (° C.) is the temperature of sodium hydrogencarbonate crystals, and R (%) is the relative humidity around the crystals at the temperature of the crystals, provided that the upper limit of the carbon dioxide gas concentration is 100 vol % to form anhydrous sodium carbonate on the surface of the sodium hydrogencarbonate crystal particles with a content of anhydrous sodium carbonate of from 0.03 to 0.4 mass % in the sodium hydrogencarbonate crystals.

2. The production process according to claim 1, wherein the content of sodium carbonate monohydrate, sodium sesquicarbonate and Wegscheider's salt in the sodium hydrogencarbonate crystal particles is at most 0.3 mass % as calculated as anhydrous sodium carbonate.

3. The process for producing sodium hydrogencarbonate crystal particles according to claim 1, wherein a slurry containing sodium hydrogencarbonate is obtained by crystallization, wet sodium hydrogencarbonate crystal particles are separated from the slurry, and the wet sodium hydrogencarbonate crystal particles are subjected to heat treatment.

4. The process for producing sodium hydrogencarbonate crystal particles according to claim 1, wherein a slurry containing sodium hydrogencarbonate is obtained by crystallization, wet sodium hydrogencarbonate crystal particles are separated from the slurry, and the wet sodium hydrogencarbonate crystal particles are dried and then subjected to heat treatment.

5. The production process according to claim 1, wherein the heat treatment is carried out by means of a rotary drier.

* * * * *